United States Patent [19]

Türck et al.

[11] 4,017,443
[45] Apr. 12, 1977

[54] COATING COMPOSITIONS CONTAINING AS BINDER AQUEOUS POLYMER DISPERSIONS

[75] Inventors: Ulrich Türck; Heinz Tetzner, both of Marl, Germany

[73] Assignee: Chemische Werke Huls Aktiengesellschaft, Marl, Germany

[22] Filed: Aug. 7, 1975

[21] Appl. No.: 602,803

[30] Foreign Application Priority Data

Aug. 8, 1974    Germany ................. 2438151

[52] U.S. Cl. ............... 260/29.6 T; 260/29.6 TA; 260/29.6 HN; 260/29.7 H; 260/29.7 T
[51] Int. Cl.² .................................... C08L 9/08
[58] Field of Search ........... 260/29.6 T, 29.6 TA, 260/29.6 HN, 29.7 H, 29.7 T

[56] References Cited

UNITED STATES PATENTS

| | | | |
|---|---|---|---|
| 3,677,991 | 7/1972 | Moore | 260/29.6 TA |
| 3,692,726 | 9/1972 | Oehmichen | 260/29.6 TA |
| 3,843,584 | 10/1974 | Turck | 260/29.7 T |

*Primary Examiner*—M. J. Welsh
*Attorney, Agent, or Firm*—Millen & White

[57] ABSTRACT

Coating compositions whose binder is an aqueous polymer dispersion produced from 35–70% by weight of styrene and/or a substituted styrene; 30–65% by weight of a fumaric acid diester of 3–6 carbon atoms in the alcohol component; 0–15% by weight of butadiene and/or a substituted butadiene; 0–3% by weight of an α,β-unsaturated carboxylic acid; and 0.2–2% by weight of an amide of an α,β-unsaturated carboxylic acid, possess good resistance to blooming when applied to asbestos cement panels.

10 Claims, No Drawings

COATING COMPOSITIONS CONTAINING AS BINDER AQUEOUS POLYMER DISPERSIONS

BACKGROUND OF THE INVENTION

This invention relates to coating compositions.

Coating compositions containing as binders aqueous polymer dispersions produced from a mixture of a fumaric acid diester, styrene, butadiene, and an α,β-unsaturated carboxylic acid are known. See German Pat. No. 1,284,549 and U.S. Pat. No. 3,843,584 (German Patent 2,149,854).

Such products for the most part fulfill the practical requirements regarding abrasion resistance, electrolyte stability, stability against pigments, weathering stability, and similar characteristics. However, one important end use cannot adequately be accomplished by the aforementioned products. When used as coating composition for asbestos cement panels, a blooming phenomena is repeatedly observed. Another serious deficiency is that repair spots on mineral substrates can penetrate through the paint, with the result that the paint has a spotty appearance.

It is an object of the present invention to provide coating compositions which lack the aforedescribed disadvantages. Other objects will be apparent to those skilled in the art.

SUMMARY OF THE INVENTION

The coating compositions of this invention, which solve the aforesaid problem, have as their binder an aqueous polymer dispersion produced from
- 35 – 70% by weight of styrene and/or a substituted styrene;
- 30 – 65% by weight of a fumaric acid diester of 3–6 carbon atoms in the alcohol component;
- 0 – 15% by weight of butadiene and/or a substituted butadiene;
- 0 – 3% by weight of an α,β-unsaturated carboxylic acid; and
- 0.2 – 2% by weight of an amide of an α,β-unsaturated carboxylic acid.

DETAILED DISCUSSION

The binders of this invention contain one curing component and one or preferably two plasticizing components. The curing (hardening) component is used in amounts of 35–70%, preferably 45–60% by weight. Styrene, a substituted styrene or a mixture thereof is employed for this purpose. Examples of substituted styrenes are α-methylstyrene, p-methylstyrene, m-ethylstyrene, p-isopropylstyrene, t-butylstyrene and halogenated derivatives thereof. Styrene is preferred.

One of the plasticizing components is a fumaric acid diester of an alcohol of 3–6 carbon atoms. Examples of such esters are dipropyl, di-isopropyl, dibutyl, dipentyl and dihexyl esters. These compounds are employed in amounts of 30–65%, preferably 35–50% by weight, based on the entire monomer mixture. Fumaric acid dibutyl ester is preferably used.

The second plasticizing component, which is utilized in amounts of 0–15%, preferably 4–6% by weight, based on the total monomer mixture, is butadiene, a substituted butadiene, or a mixture thereof. Examples of substituted butadienes are isoprene and chlorobutadiene. Butadiene is preferred.

In some cases it is advantageous to improve stability and adhesion, by addition of an α,β-unsaturated carboxylic acid of 3–5 carbon atoms in amounts of 0–3%, preferably 0.5 – 2.5% by weight. Examples of such acids are acrylic, methacrylic, maleic and fumaric acids.

An amide of an α,β-unsaturated carboxylic acid of 3–5 carbon atoms is employed in amounts of 0.2 – 2%, preferably 0.5 – 1.5% by weight, based on the total monomer mixture. Examples of such amides are acrylamide, methacrylamide, maleic acid amide and fumaric acid amide. Acrylic acid amide is preferred. When employing both an α,β-unsaturated carboxylic acid and an amide thereof, it is advantageous that the sum total of both of them is no more than 4% of the total monomer mixture.

As demonstrated by comparative experiments, only small amounts of acrylic acid amide or like amide are required to obtain a well-covering coating composition. Blooming phenomena are no longer observed. It is not advantageous to use the acrylic acid amide in quantities of more than 2% by weight, since the viscosity of the binder then rises greatly.

In addition to the binder, the coating composition ordinarily contains conventional auxiliary agents, such as pigment distributors, auxiliary film-forming agents, preservatives, thickeners, or similar substances. The coating compositions can be applied in pigmented or unpigmented form.

The binders of this invention are manufactured according to the emulsion polymerization method, which operation can be batch-wise as well as the feeding or metering method. Such a procedure is described in U.S. Pat. No. 3,843,584, whose disclosure is incorporated by reference.

The coating compositions of this invention possess, in addition to good overall properties, excellent covering power, especially on repaired mineral substrates, and a good capacity for suppressing blooming. Moreover, it has been found, surprisingly, that the binders of this invention exhibit better friction stability and in some cases also a better electrolyte stability compared to comparable products of the prior art.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

In accordance with Example 5 of U.S. Pat. No. 3,843,584, a 50% solids aqueous polymer dispersion is produced from the following mixture of monomers:
- 47 parts by weight of styrene
- 46 parts by weight of fumaric acid dibutyl ester
- 6 parts by weight of butadiene
- 1 part by weight of acrylic acid amide A polymerization reactor was charged with the styrene, dibutylfumarate, and acrylamide along with 100 parts of water, 1.0 part of oxyethylated lauryl alcohol (av. oxylation of 17), 0.5 part paraffin sulfonate mixture (median carbon atom no. of 14–15) and 1.0 part of ammonium peroxydisulfate, purged thoroughly with nitrogen, evacuated, charged with the butadiene and then heated to 60° C. The charge was polymerized to a 50% solids content in 14 hours by heating to 70° C. after 4 hours.

When testing the thus-obtained binder, during the measurement of the friction stability, a deposit on the rolls occurs only after 40 minutes. To measure the fraction stability, the dispersion to be tested is filled into a trough in which two oppositely rotating rubber rolls are immersed. The running time of the rolls is measured until a dry coating has formed on these rolls.

A coating composition of the following recipe is produced from the above binder:
- 170 parts by weight of water
- 1 part by weight of pigment distributor
- 100 parts by weight of iron oxide pigment
- 100 parts by weight of pulverized asbestos (particle size 0–20 μm.)
- 60 parts by weight of methylcellulose, highly viscous (2% in water)
- 300 parts by weight of binder (50% solids proportion)

The coating composition is sprayed with a coat of 300 g./m$^2$ onto asbestos cement plates. A coat having a silky gloss and completely flawless surface structure is thus obtained.

COMPARATIVE EXAMPLE A

In accordance with Example 1, an otherwise identical binder is produced except the acrylic acid amide is replaced entirely by acrylic acid. In the test for friction stability, in 10 minutes deposits forms on the rolls. A coating composition prepared from this binder according to the recipe of Example 1, sprayed in the same way onto asbestos cement plates, shows spots after the coated plates have been dried.

EXAMPLE 2

An aqueous polymer dispersion (50% solids per weight) is produced from the following mixture of monomers:
- 48 parts by weight of fumaric acid dibutyl ester
- 44 parts by weight of styrene
- 5 parts by weight of butadiene
- 2 parts by weight of acrylic acid
- 1 part by weight of acrylic acid amide From this dispersion, a coating composition for interior painting is prepared having the following composition:
- 261 parts by weight of water
- 3 parts by weight of polyphosphate
- 5 parts by weight of methylcellulose, highly viscous
- 5 parts by weight of pigment distributor
- 3 parts by weight of defoamer
- 2 parts by weight of preservative
- 50 parts by weight of China clay [= kaolin]
- 100 parts by weight of calcium carbonate, finely divided
- 320 parts by weight of calcite
- 75 parts by weight of titanium dioxide
- 1 part by weight of sodium hydroxide (50% in water)
- 15 parts by weight of auxiliary film-forming agent
- 160 parts by weight of binder (50% solids content)

The coating composition is applied to a wall with a padded roller. The coating thickness is about 200 g./m$^2$. A well-covering, flawless coat of paint is thus obtained.

COMPARATIVE EXAMPLE B

In accordance with Example 2, an otherwise identical binder is produced except the acrylic acid amide is replaced by acrylic acid, i.e., it contains 3 parts by weight of acrylic acid based on the total monomer mixture. A correspondingly prepared and applied coating composition shows, after drying, penetrating spots if the wall has been previously repaired with plaster of Paris. The paint on the wall surface has an all-over cloudy appearance.

EXAMPLE 3

In accordance with example 1 a coating composition is produced. The therefore used binder is obtained by polymerizing the following mixture of monomers under conditions of above mentioned example 1:
- 35 parts by weight of styrene
- 64 parts by weight of fumaric acid dibutyl ester
- 1 part by weight of acrylic acid amide The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What is claimed is:

1. An aqueous coating composition whose binder consists essentially of an aqueous dispersion of a polymer produced from a mixture of monomers consisting of, by weight,
   a. 35–70% of styrene, a substituted styrene or mixture thereof;
   b. 30–65% of a fumaric acid diester of 3–6 carbon atoms, in the alcohol component;
   c. 0–15% of butadiene, a substituted butadiene or mixture thereof;
   d. 0–3% of an α,β-unsaturated carboxylic acid; and
   e. 0.2–2% of an amide of an α,β-unsaturated carboxylic acid.

2. A pigmented coating composition whose binder is an aqueous latex of claim 1.

3. A coating composition of claim 2 wherein the polymer is produced from a mixture of monomers consisting of, by weight,
   a. 45–60% of styrene, a substituted styrene or mixture thereof;
   b. 35–70% of a fumaric acid diester of 3–6 carbon atoms, in the alcohol component;
   c. 4–6% of butadiene, a substituted butadiene or mixture thereof;
   d. 0–2.5% of an α,β-unsaturated carboxylic acid; and
   e. 0.5–1.5% of an amide of an α,β-unsaturated carboxylic acid.

4. A coating composition of claim 2 wherein component (a) is styrene, component (c) is butadiene and component (d) is acrylic acid.

5. A coating composition of claim 2 wherein component (b) is fumaric acid dibutyl ester.

6. A coating composition of claim 2 wherein component (e) is acrylamide.

7. A pigmented coating composition of claim 2 wherein the monomeric mixture contains 0.5–1.5% by weight of component (e).

8. A pigmented coating composition of claim 2 wherein the polymer is produced from
   a. 35–75% by weight of styrene;
   b. 30–65% by weight of fumaric acid dibutyl ester;
   c. 0–15% by weight of butadiene;

d. 0–3% by weight of acrylic acid; and
e. 0.2–2% by weight of acrylamide.

9. A pigmented coating composition of claim 2 wherein the polymer is produced from
a. 45–60% by weight of styrene;
b. 35–50% by weight of fumaric acid dibutyl ester;
c. 4–6% by weight of butadiene;
d. 0–2.5% by weight of acrylic acid; and
e. 0.5–1.5% by weight of acrylamide.

10. A pigmented coating composition of claim 2 wherein the polymer is produced from
a. 48% by weight of styrene;
b. 44% by weight of fumaric acid dibutyl ester;
c. 5% by weight of butadiene;
d. 2% by weight of acrylic acid; and
e. 1% by weight of acrylamide.

* * * * *